April 9, 1957

C. L. PARSONS 2,788,485

TRANSLATOR DRIVE

Filed May 22, 1953

INVENTOR
C. L. PARSONS

BY

ATTORNEYS

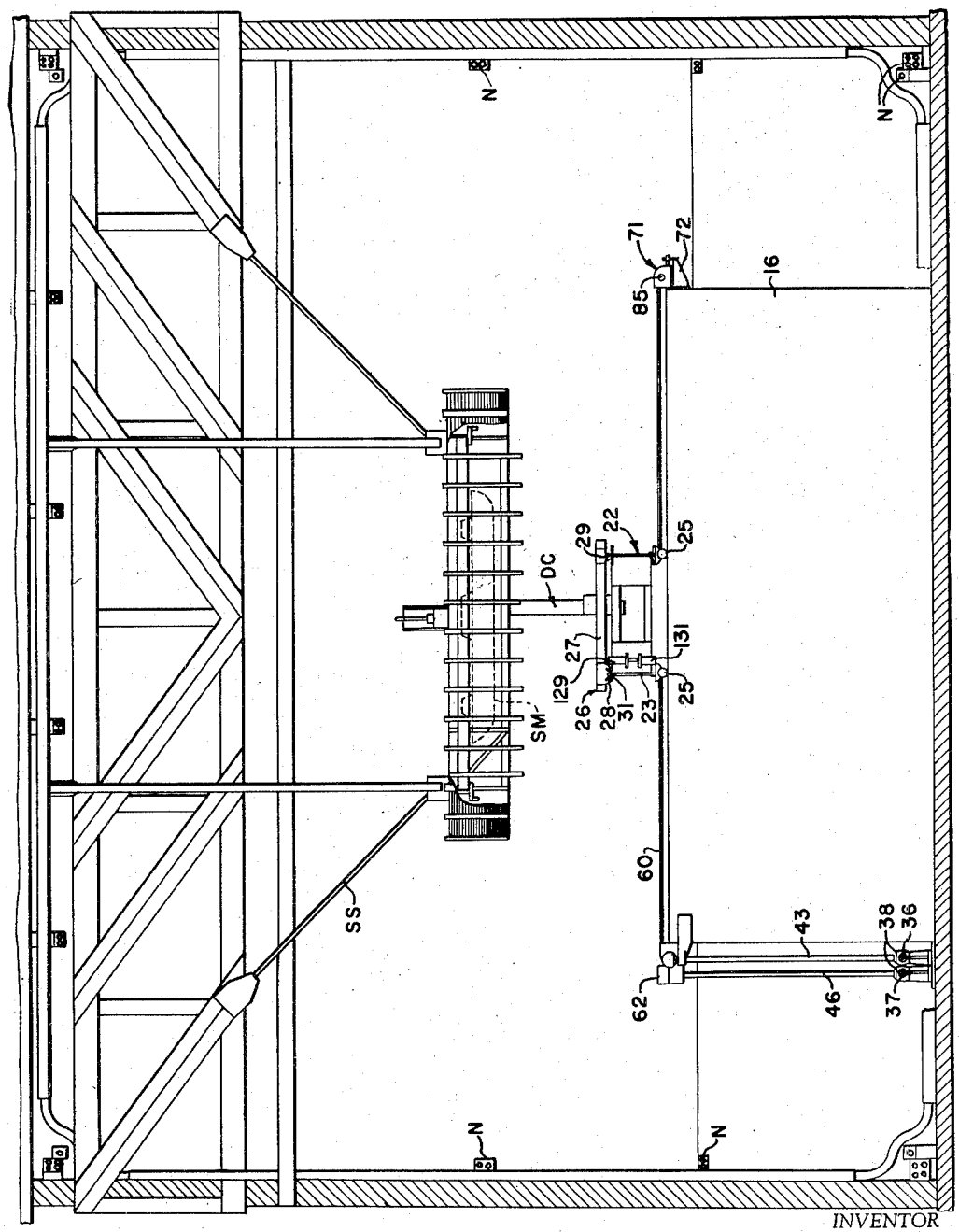

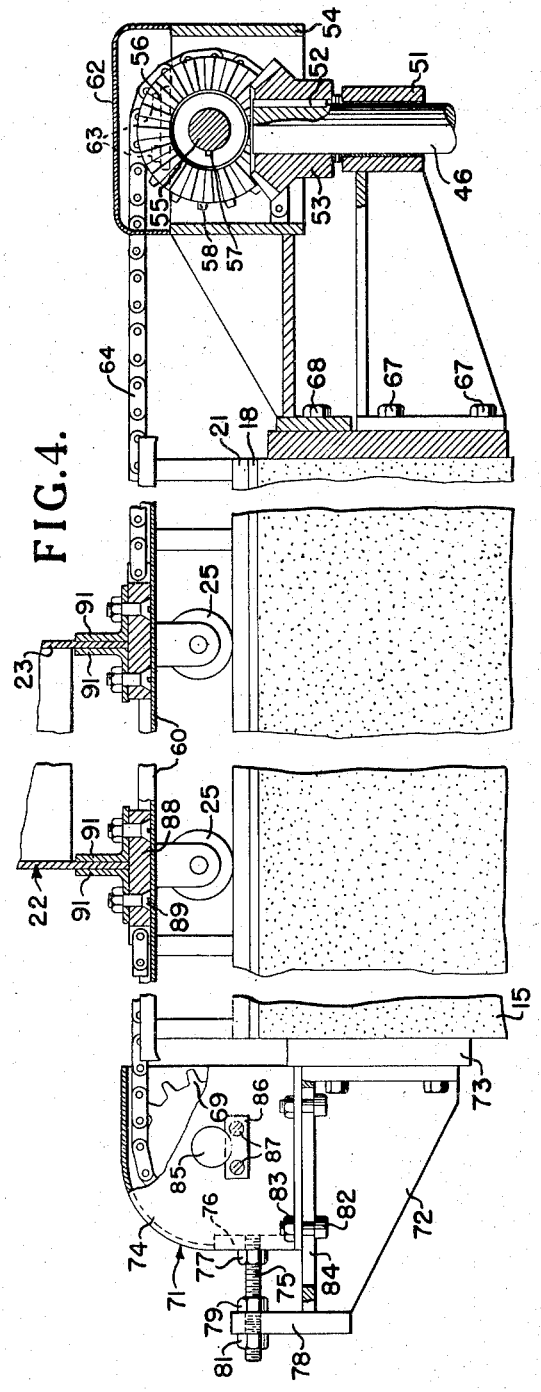
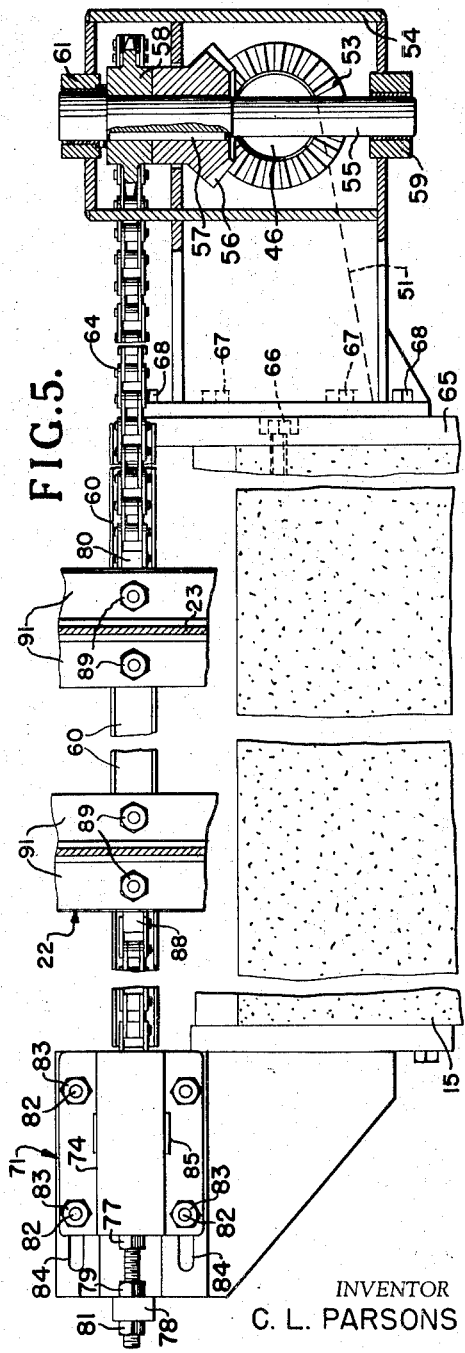

April 9, 1957  C. L. PARSONS  2,788,485
TRANSLATOR DRIVE

Filed May 22, 1953  6 Sheets-Sheet 5

INVENTOR
C. L. PARSONS

BY
G. M. O'Brien
R. M. Hicks
ATTORNEYS

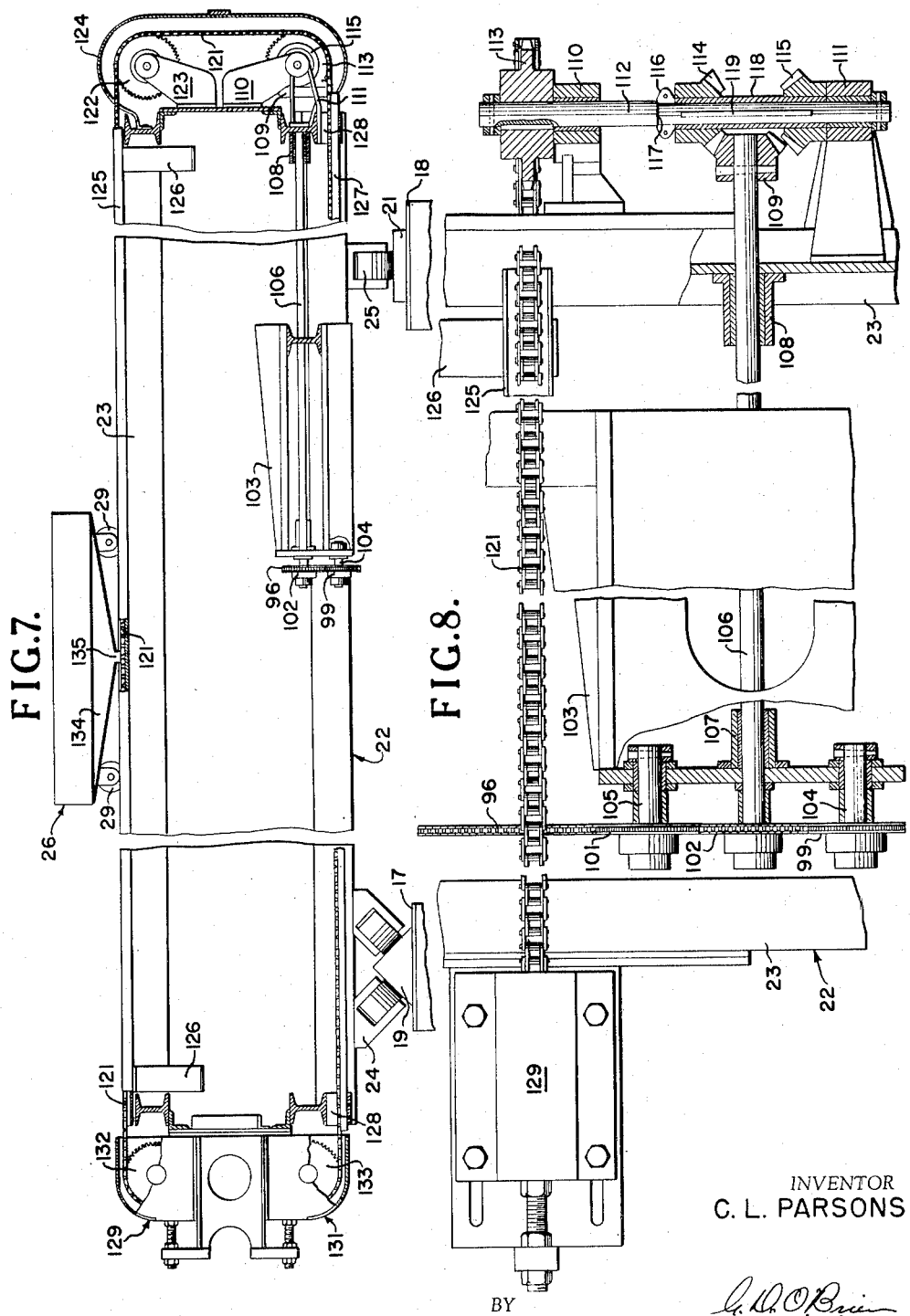

United States Patent Office 2,788,485
Patented Apr. 9, 1957

2,788,485
TRANSLATOR DRIVE

Chauncey L. Parsons, Burtonsville, Md., assignor to the United States of America as represented by the Secretary of the Navy Application May 22, 1953, Serial No. 356,913

13 Claims. (Cl. 324—43)

(Granted under Title 35, U. S. Code (1952), sec. 266)

The invention described herein may be manufactured and used by or for the Government of the United States of America for governmental purposes without the payment of any royalties thereon or therefor.

The present invention relates to a translator drive for magnetic detection apparatus used in plotting the magnetic signatures of ship models. More particularly the invention relates to a mechanism employing longitudinal and transverse carriages. The longitudinal carriage is mounted on rails for translational movement on one path such, for example, as in a north-south direction while the transverse carriage is mounted upon the longitudinal carriage for movement therewith on the same path and, additionally, may be moved on a path at right angles thereto, or, for example, in an east-west direction. The mechanisms for imparting such movement to the carriages are driven by separate shafts, one shaft being driven directly from a motor while the other shaft is driven by the first shaft through a variable ratio transmission, thus to provide a plurality of different ratios of speeds between the first shaft and the second shaft.

A transmission of the type heretofore described is more fully set forth in the copending application of Norman Czajkowski for Translator Drive and Clutch Synchronizing Mechanism, filed May 22, 1953, Serial No. 356,920, now Patent No. 2,709,782. By employing a variable ratio transmission the speed of travel of one carriage with respect to the other carriage may be varied, thus the angular motion of a magnetic detector device mounted on the transverse carriage may be varied, for example, if both carriages are driven in their respective directions at the same speed an angular motion of 45° will result for the magnetic detector, while various other angular motions will result when the relative speed ratios of the carriages are changed. Provision is also made for driving either of the carriages without driving the other.

It is thus clear that there has been provided a device well adapted for use in the detection of magnetic fields of ship models and other magnetic ordnance devices. In the use of the present invention, a magnetic ship model is suspended above the apparatus of the present invention in a substantially fixed position, the magnetic detection device being moved on a single plane under the model on a series of parallel paths, for example, spaced an inch apart and running in a direction coincident to the longitudinal axis of the model or the series of paths may be at right angles or other angles with respect to the longitudinal axis of the model, such angular motion being accomplished by employing certain gear ratios of the aforementioned transmission.

An object of the present invention is to provide a new and improved translator drive mechanism for a magnetic detector wherein the drive is positive thus assuring accurate movement of the detector with respect to a ship model.

Another object is to provide a new and improved translator drive mechanism for a magnetic detector wherein the detector is moved with respect to a ship model on a plurality of selected angular paths.

Still another object is to provide a new and improved translator drive mechanism for a magnetic detector wherein a first carriage of the mechanism is driven at substantially constant speed on a first path while a second carriage is driven on the first carriage at selected speeds with respect to the first carriage and on a second path at right angles to the first path to provide selected angular motion of the detector with respect to a ship model.

Other objects and many of the attendant advantages of this invention will be readily appreciated as the same becomes better understood by reference to the following detailed description when considered in connection with the accompanying drawings wherein:

Fig. 3 is a sectional view taken along the line 3—3 of Fig. 1;

Fig. 4 is an enlarged vertical sectional view taken along the line 4—4 of Fig. 1 and showing the chain drive mechanism for the longitudinal carriage;

Fig. 5 is a horizontal sectional view of the mechanism of Fig. 4;

Fig. 7 is a vertical sectional view taken along the line 7—7 of Fig. 2 and showing the portion of the chain drive mechanism for the transverse carriage which is mounted on the longitudinal carriage;

Fig. 8 is a horizontal sectional view of the mechanism of Fig. 7; and

Figure 1:
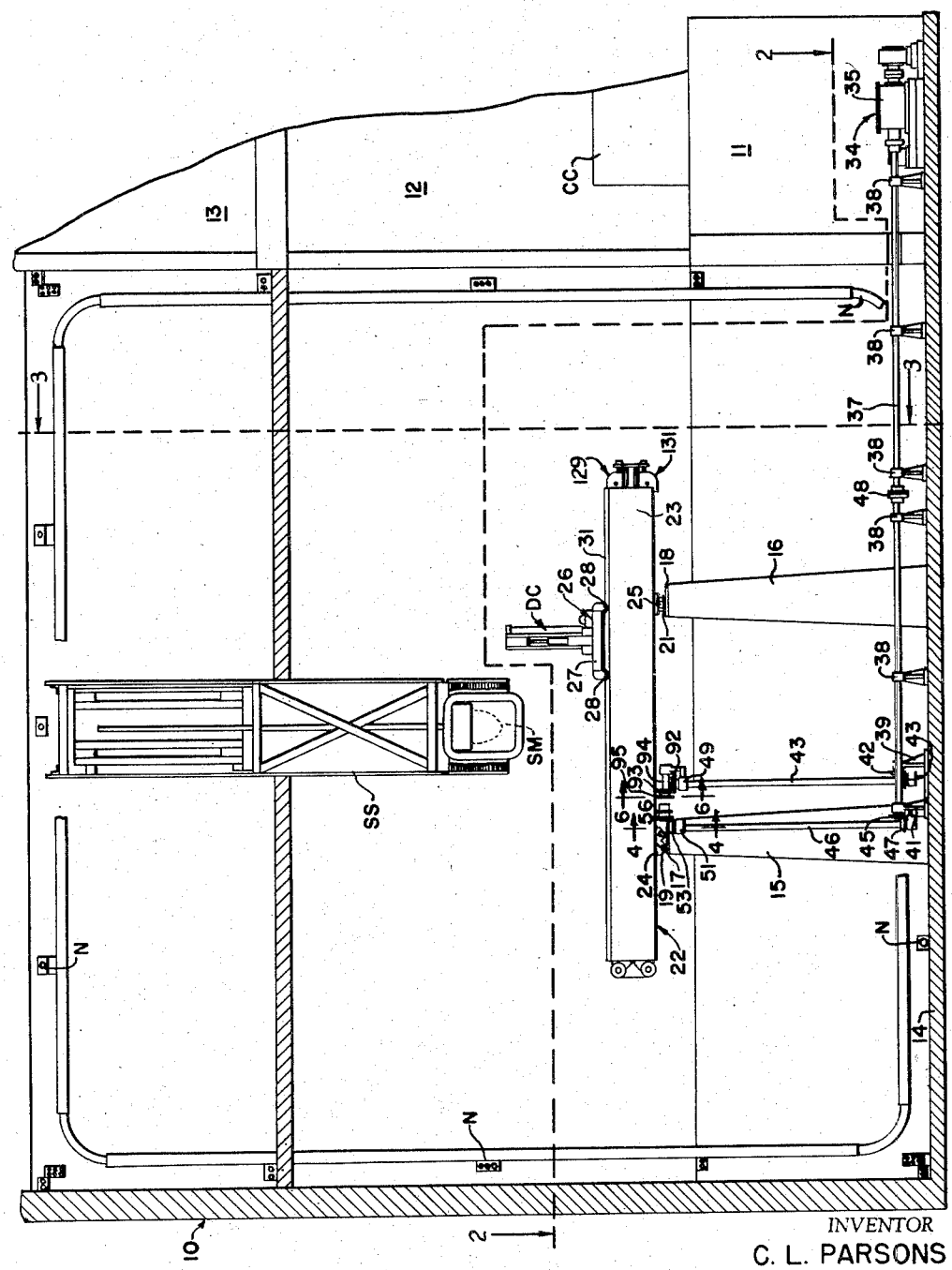
Fig. 1 is a vertical sectional view of a building and showing the apparatus of the present invention set up therein.

Referring more particularly to the drawings wherein like numerals indicate like parts throughout the several views, a building, in which the device of the present invention is mounted, is formed of nonmagnetic materials and is indicated generally at 10, and has a basement area 11, a first floor area 12, and an attic area 13. Extending from floor 14 of basement area 11 are the piers 15 and 16 preferably formed of concrete and having metal plates 17 and 18, respectively mounted on the top surface thereof.

Mounted on plate 17 is a rail 19 having a triangular cross-sectional shape the purpose of which will be hereinafter more fully described. Plate 18 has mounted thereon a flat rail 21. Plates 17 and 18, and rails 19 and 21 extend the full length of piers 15 and 16.

A carriage indicated generally at 22 is mounted for rolling movement on rails 19 and 21, and moves in a north-south direction longitudinally with respect to a ship model SM which is suspended by supporting structure SS above the carriage 22. Carriage 22, which will be hereinafter referred to as the longitudinal carriage, comprises a frame 23, on the underside of which are mounted the angularly mounted double roller assemblies 24 on one side thereof and the usual roller assemblies 25 on the other side thereof. Rollers 24 run on the triangular rail 19 while rollers 25 run on flat rail 21. It is clear that contact of rollers 24 and with rail 19 prevents lateral motion of carriage 22.

A transverse carriage 26 is mounted upon carriage 22, and has a frame 27 under which is mounted angular double roller assemblies 28 on one side thereof and the single roller assemblies 29 on the other side thereof. Carriage 26 rolls in an east-west direction on triangular rail 31 and flat rail 32 mounted on the top of frame 23 of carriage 22. It is to be understood that the directions north-south and east-west while being the most desirable directions of travel for the carriage 22 and 26, respectively, the device may be positioned in a manner whereby the carriage 22 moves in an east-west direction and carriage 26 in a north-south direction or any other desired directions. Tracks 31 and 32 run the full length of frame 23, the triangular track 31 and rollers 28 preventing lateral motion of carriage 26 with respect to carriage 22.

In order to provide rolling motion for carriages 22 and 26, a reversible motor 33 is provided which drives the transmission and clutch assembly 34 clearly disclosed in the aforementioned application of Norman Czajkowski. The transmission and clutch assembly 34 provides the variations in the relative speeds of the two carriages 22 and 26 thus to provide selectively a variety of angular paths of travel for a magnetic detector coil DC mounted on carriage 26.

The transmission 35 of assembly 34 is provided with a plurality of shiftable gears (not shown) capable of producing gear ratios for movement of carriage at 0°, which is along a path transverse to the longitudinal axis of model SM, at 45°, 30°, 60° and 90°, all transverse with respect to the longitudinal axis of model SM.

Drive shaft 36 which is driven by motor 33 extends through transmission 35 and drives shaft 37 through the gears of the transmission, thus the speed of shaft 36 remains constant while the speed of shaft 37 is variable in accordance with the selected ratio of the gears of transmission 35. At the 0° position of gears of the transmission the gears are in neutral position thus only shaft 36 turns, while shaft 37 is stationary. At the 90° position both shafts rotate at the same speed, while in the 45° position shaft 37 rotates at half the speed of shaft 36. In the 30° and 60° positions the gear ratios are such that 30° and 60° paths of travel are provided for the detector coil DC.

Shafts 36 and 37 are supported by a plurality of bearings 38 in spaced relation with respect to floor 4 and extend to standards 39 and 41 respectively. Standard 39 supports the end of shaft 36 on which the bevel gear 42 is fixed, standard 39 also supports the lower end of vertical shaft 43 on which is fixed bevel gear 44 meshing with gear 42 thus providing a positive drive between shafts 36 and 43.

Standard 41 supports the end of shaft 37 on which is fixed bevel gear 45, and also supports the lower end of vertical shaft 46 on which is fixed the bevel gear 47 meshing with gear 45 and providing thereby a positive drive between shafts 37 and 46. If desired flexible couplings 48 may be interposed between the lengths of shafting which make up the shafts 36 and 37 to compensate for expansion and contraction of the shafts and to also compensate for slight misalignment thereof.

Mounted adjacent the upper end of pier 15 and above standards 39 and 41 are brackets 49 and 51, bracket 49 supporting the upper end of shaft 43 and bracket 51 supporting the upper end of shaft 46.

Fixed to the upper end of shaft 46 by key 52 is a bevel gear 53 which extends into gear box 54. Gear box 54 supports a lateral shaft 55 on which a bevel gear 56 is fixed by key 57. Key 57 also fixes a sprocket 58 for rotation with shaft 55. Shaft 55 is rotatably supported in box 54 by a pair of bearings 59 and 61. A cover 62 is provided for box 54 secured by bolts 63, there being appropriate openings in box 54 and cover 62 for a roller chain 64 to pass through. Chain 64 is fitted over sprocket 58 and is driven thereby. A mounting plate 65 is mounted on pier 15 by anchor bolts 66, bracket 51 being secured to plate 65 by bolts 67, while gear box 54 is secured to plate 65 by bolts 68.

Chain 64 extends along the length of pier 15 and is fitted over an idler sprocket 69 at the other end of pier 15. Sprocket 69 is mounted in chain tightener assembly 71 for maintaining chain 64 tight and which comprises a fixed bracket 72 secured to mounting plate 73 fixed to pier 15 in the manner of plate 65 and a movable sprocket housing 74. Housing 74 is moved by means of screw 75 threaded into wall 76 thereof, and held therein by locknut 77. The other end of screw 75 passes through plate 78 secured to bracket 72, nuts 79 and 81 being employed to move the sprocket housing into adjusted position and to lock the housing in a manner well known in the art. Bolts 82 and nuts 83 therefor are employed to firmly lock housing 74 in adjusted position, the nuts 83 being loosened during the adjustment of the chain, elongated slots 84 being provided in bracket 72 to permit movement of housing 74. Sprocket 69 rotates on shaft 85 which is held in housing 74 by locking plate 86 secured to the housing by screws 87.

The ends of chain 64 are secured to attaching plates 88 which are held by bolts 89 to flange members 91 of frame 23 of carriage 22. Thus, carriage 22 is moved along rails 19 and 21 on rollers 24 and 25 by rotation of shaft 37 in either direction, through gears 45 and 47, shaft 46, gears 53 and 56, sprocket 58, and chain 64. Chain 64 preferably is supported along the length thereof by tracks 60 thereby to prevent sagging of the chain and thus prevent undue wear thereof.

Shaft 43 has mounted on the upper end thereof a bevel gear 92 meshing with bevel gear 93 on shaft 94. A drive sprocket 95 is mounted on shaft 94 and driven thereby. A roller chain 96 similar to chain 64 is trained over drive sprocket 95 and an idler sprocket 97 at the other of pier 15.

Sprocket 97 is mounted in a chain tightener assembly 98 and as the mechanical construction thereof is similar to tightener 71 no further description thereof is deemed necessary. Chain 96 is a continuous loop and is not secured to either carriage, chain 96 passes under a pair of idler sprockets 99, 101 and over a drive sprocket 102 which is mounted between sprockets 99 and 101. Sprockets 99, 101 and 102 are supported on frame 23 by bracket 103, sprockets 99 and 101 being supported on idler shafts 104 and 105, respectively, while sprocket 102 is fixed on drive shaft 106 mounted in bearing 107 of bracket 103 and bearing 108 of frame 23. Shaft 106 extends through one end of frame 23 and has fixed on the end thereof a bevel gear 109. Brackets 110, 111 mounted on frame 23 support a shaft 112 having a sprocket 113 fixed thereon. A pair of opposed reversing bevel gears 114, 115 are slidably mounted on shaft 112 for rotation therewith, gears 114 and 115 being arranged to alternately engage gear 109 thereby to change the direction of rotation of shaft 112 with respect to shaft 106. In order to alternately lock gears 114, 115 in engaged position with gear 109, a spacer clamp 116 is provided for clamping around shaft 112 between gear 114 and shoulder 117 of shaft 112 when it is desired to engage gears 114 and 109, and between gear 115 and bracket 111 when gears 115 and 109 engage. In order to maintain the spacing between gears 114 and 115 the gears are fixed to opposite ends of a split tubular member 118. A key 119 is set in shaft 112 and extends through the split of member 118 to engage gears 114, 115 thus gears may be shifted to reverse the rotation of shaft 112.

A roller chain 121 is trained over drive sprocket 113 and an idler sprocket 122 which is supported by bracket 123 and mounted directly above sprocket 113. A guard housing 124 encloses sprockets 113 and 122. The upper stretch of chain 121 passes over frame 23 toward the opposite end thereof in a track 125 supported on the frame by brackets 126, while the lower stretch of chain 121 passes under frame 23 toward the opposite end thereof in a track 127 supported on the frame by brackets 128.

Mounted on the opposite end of the frame 23 are a pair of chain tightening devices 129, 131 each similar to the tightening assembly 71 and supporting for adjustment the idler sprockets 132, 133 respectively. Chain 121 is trained over the sprockets 132, 133.

Transverse carriage 26 is fixed to chain 121 by a bracket 134 and a pin or bolt 135 which passes through the chain 121 and bracket 134, bolt 135 replacing one of the usual pins securing the links of the chain together.

It will be seen from the foregoing that carriage 22 is moved in a north-south direction by rotation of shaft 37 through transmission 35 driven by motor 33, while carriage 26 is moved in an east-west direction by rotation of shaft 36 driven by motor 33, thus shaft 36 rotates at a substantially constant speed when motor 33 is operated, while shaft 37 rotates at a speed variable in accordance with the selected ratio of the gears of transmission 35. The various gear ratios provide the changes of angle of travel of the detector coil DC, as aforesaid.

Figure 2:
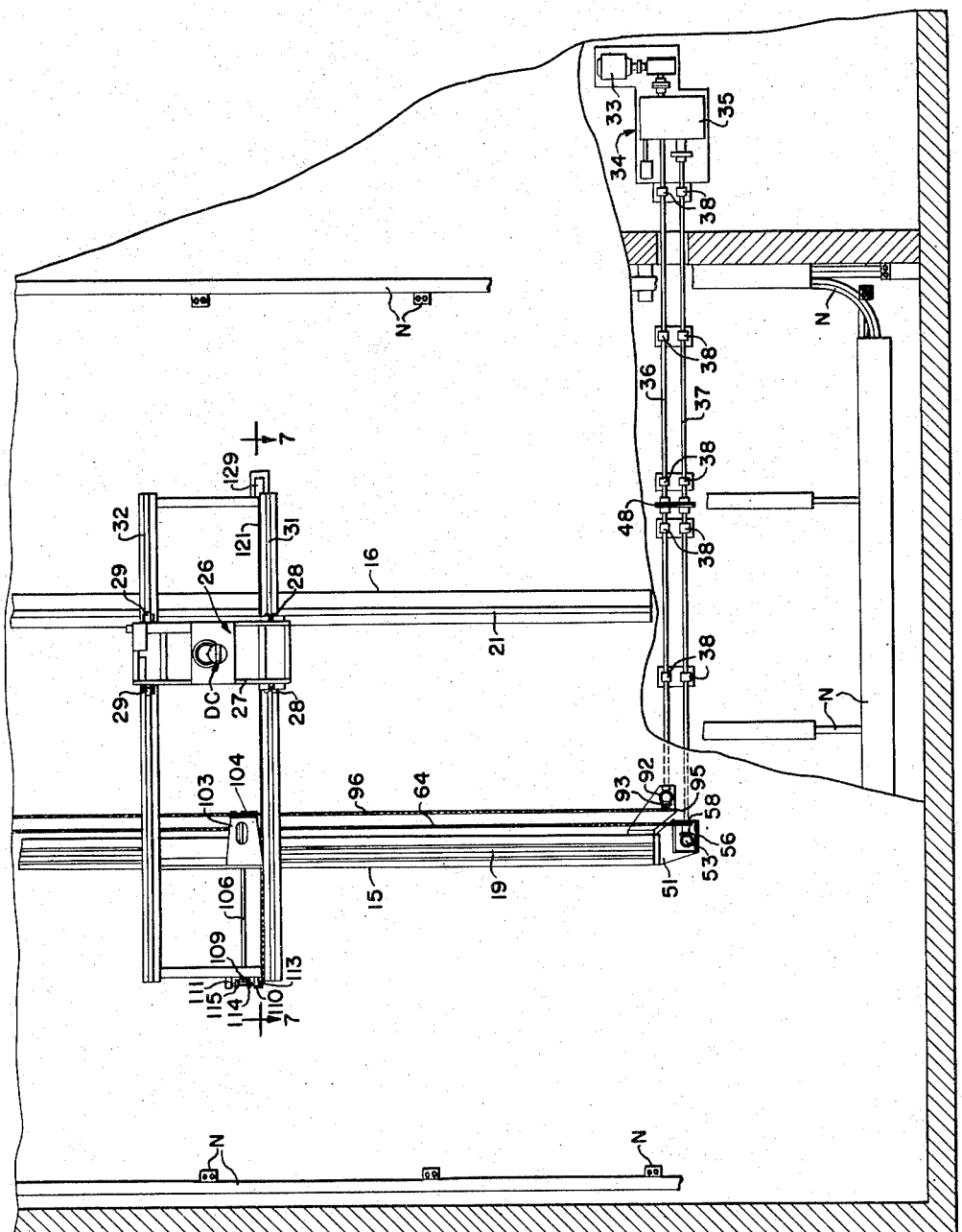
Fig. 2 is a sectional view taken along the line 2—2 of Fig. 1.
Figure 6:
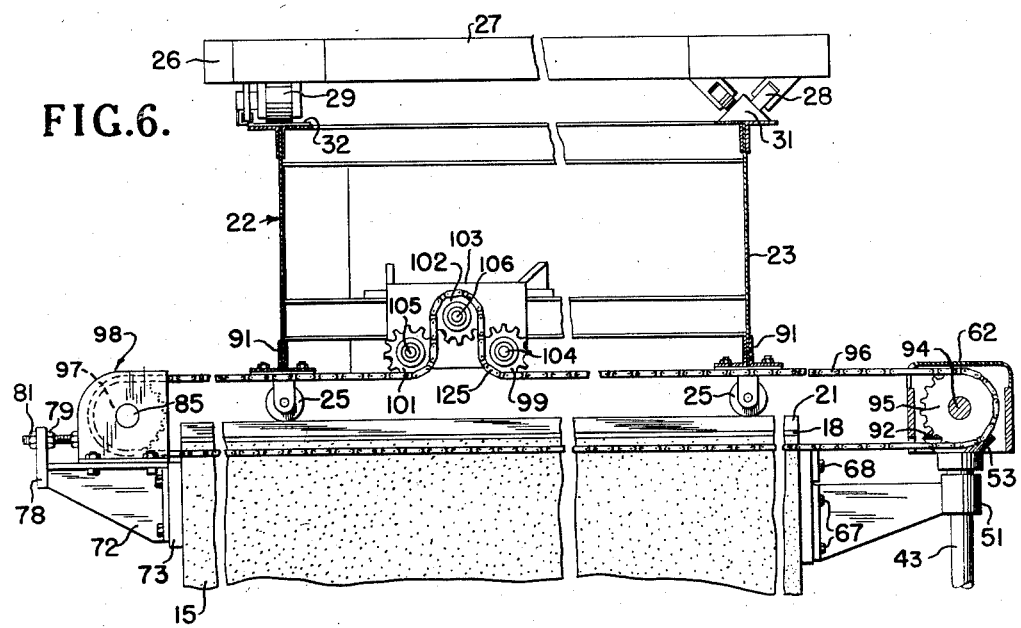
Fig. 6 is a vertical sectional view taken along the line 6—6 of Fig. 1 and showing a portion of the chain drive mechanism for the transverse carriage.
Figure 9:
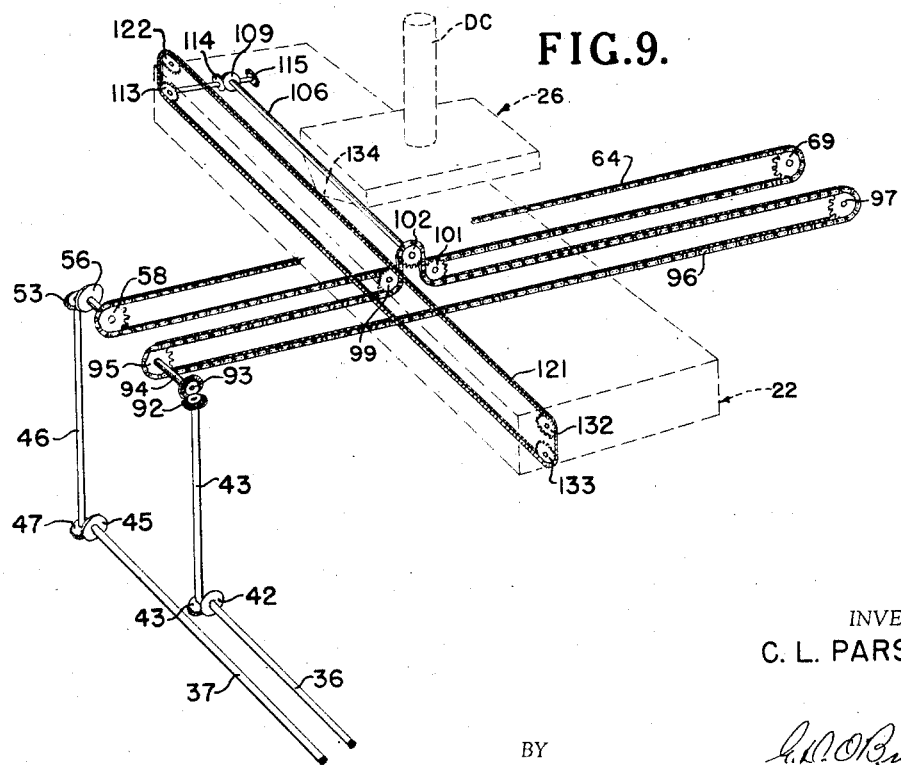
Fig. 9 is a diagrammatic perspective view of the drive system of the present invention.

In the use of the device the detector coil DC is travelled beneath the ship model SM in a plurality of paths at a selected angle, spaced an inch apart, for example, and covering the full range of travel of the carriages, if desired. Thus a series of cuts are made through the magnetic field of the ship model from which charts are made indicative of the magnetic signature of a full-size ship. It is, of course, clear that recording apparatus is connected with the detector coil DC and may be set up in the control console CC shown in Figs. 1 and 2. The control console may also contain all control apparatus for remotely operating the drive mechanism such, for example, as reversing switches for the motors, indicator lamps for the various ratios of the transmission and other such apparatus.

It should be noted that all metallic parts of the device, included within the area surrounded by a plurality of nulling coils N, are formed of non-ferrous metals such, for example, aluminum, brass, and bronze, to prevent distortion to the magnetic signature of the model. It is also to be noted that the nulling coils N prevent to a great extent the distortions to the signature caused by the earth's magnetic field and the distortions caused by such stray magnetic bodies as automobiles and other such devices in the area.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent in the United States is:

1. Apparatus for travelling a magnetic detector coil on a plurality of selectable angular paths in a horizontal plane with respect to a magnetic model comprising, in combinaion, first means mounted for motion in a first path, second means supporting the coil and mounted on the first means for motion therewith and for motion in a second path at right angles to the first path, variable speed means for moving the first and second means on the first path, constant speed means for moving the second means on the second path whereby a plurality of angular paths for the coil are provided in accordance with the variations of speed ratio between the first and second means, and a reversing gear interposed in the constant speed means for reversing the motion of the second means with respect to the first means.

2. Apparatus for travelling a magnetic detector coil on a plurality of selectable angular paths in a horizontal plane with respect to a magnetic model comprising, in combination, first means mounted for motion in a first path, second means supporting the coil and mounted on said first means for motion in a second path at right angles to the first path, variable speed means for moving the first means on said first path, and constant speed means for moving the second means on said second path whereby a plurality of angular paths for the coil are provided in accordance with the variations of speed ratio between the first and second means.

3. Apparatus for travelling a magnetic detector coil on a plurality of selectable angular paths in a horizontal plane with respect to a magnetic model comprising, in combination, a first carriage mounted for rolling motion on a first path of travel, a second carriage supporting the detector coil and mounted on said first carriage for motion therewith on said first path of travel and for rolling motion on a second path at right angles to the first path, variable speed means for moving the first carriage along the first path of travel, constant speed means for moving the second carriage along the second path of travel, means on said first carriage for preventing motion of carriage transverse to the first path of travel, means on said second carriage for preventing transverse motion of the second carriage with respect to the first carriage, and a reversing gear in said constant speed means whereby the motion of the second carriage is reversed.

4. Apparatus for travelling a magnetic detector coil on a plurality of selectable angular paths in a horizontal plane with respect to a magnetic model comprising, in combination, a motor having a selectable variable ratio gear box driven thereby, a first shaft driven at selected ratios by said gear box, a second shaft driven at a fixed ratio by said motor, a first drive sprocket driven by said first shaft, a first idler sprocket in spaced alignment with said first drive sprocket, a second drive sprocket driven by said second shaft, a second idler sprocket in spaced alignment with said second drive sprocket, a first chain suspended on the first drive and idler sprockets and driven by the first sprocket, a second chain suspended on the second drive and idler sprockets and driven by the second drive sprocket, a first carriage mounted for rolling motion in a first path of travel and driven by said first chain, a driven sprocket mounted on said first carriage and driven by said second chain, a reversing gearing mounted on said first carriage driven by said driven sprocket, a third drive sprocket driven by the reversing gearing and mounted on the first carriage, a plurality of idler sprockets mounted on the first carriage for supporting the third chain, and a second carriage mounted for rolling motion on the first carriage at right angles to the motion of the first carriage, said carriage being fixed at one point to the third chain whereby the second carriage is moved.

5. Apparatus for travelling a magnetic detector coil on a plurality of selectable angular paths in a horizontal plane with respect to a magnetic model comprising, in combination, a first carriage of non-magnetic material mounted for rolling motion in a first path, a second carriage of non-magnetic material supporting said coil and mounted for rolling motion on said first carriage in a second path at right angles to said first path, a motor mounted remotely with respect to said coil, selectable variable ratio power transmitting means connecting said motor with said first carriage, constant ratio power transmitting means connecting said motor with said second carriage, means in said variable and constant ratio power transmitting means for substantially eliminating back-lash therein, means for preventing motion of said first carriage transversely of said first path, and means for preventing motion of said second carriage transversely with respect to the first carriage in said second path.

6. Apparatus for travelling a magnetic detector coil on a plurality of selectable angular paths in a horizontal plane with respect to a magnetic model comprising, in combination, a first carriage composed of non-magnetic material mounted for rolling motion in a first path, a second carriage composed of non-magnetic material supporting said coil and mounted for rolling motion on said first carriage beneath said magnetic model in a second path at right angles to said first path, a motor for driving said first and second carriages, variable ratio power transmitting means connecting said motor with said first carriage, constant ratio reversible power transmitting means connecting the motor with said second carriage, said variable ratio and constant ratio power transmitting means including chains, and tightening means for said chains whereby back-lash therein is substantially eliminated.

7. Apparatus for travelling a magnetic detector coil on a plurality of selectable angular paths in a horizontal plane with respect to a magnetic model comprising, in combination, a pair of elongated parallel piers, a first flat track extending along the top of one of said piers, a first track triangular in cross section extending along the top of the other of said piers, a first carriage, a first plurality of single rollers mounted under one side of said first carriage and engaging the flat track, a first plurality of angularly mounted double rollers mounted under the other side of said first carriage and engaging two faces of the triangular track, a second flat track mounted on one side of the top of the first carriage and extending along the length thereof, a second track triangular in cross section mounted on the other side of the top of the first carriage and extending along the length thereof, a second carriage, a second plurality of single rollers mounted under one side of said second carriage and engaging the second flat track, a second plurality of angularly mounted double rollers mounted under the other side of said second carriage and engaging two faces of the second triangular track, a motor variable speed means driven by the motor and driving said first carriage, and constant speed means driven by the motor and driving the second carriage, said variable and constant speed means providing a plurality of speed ratios between the first and second carriages thereby to provide a plurality of paths of different angles for said coil.

8. Apparatus for travelling a magnetic detector coil on a plurality of selectable angular paths in a horizontal plane with respect to a magnetic model comprising, in combination, a pair of elongated parallel piers, first pair of tracks on the top of said piers, a first carriage mounted for rolling motion on said tracks, a pair of parallel tracks mounted on said first carriage and oriented 90° with respect to the first tracks, a second carriage mounted for rolling motion on said second tracks, first driving means for moving the first carriage on the first tracks, second driving means for moving the second carriage on the second tracks, and selective variable ratio means interconnecting said first and second driving means whereby the carriages are driven at different selected speeds relative to each other thereby to provide selected angular paths of travel for the detector coil.

9. Apparatus for travelling a magnetic detector coil on a plurality of selectable angular paths in a horizontal plane with respect to a magnetic model comprising, in combination, a first carriage mounted for movement in a first path, a second carriage mounted on said first carriage for movement in unison with said first carriage in said first path and for movement on said first carriage in a second path at right angles to said first path, said second carriage having the detector coil mounted thereon, a source of power, a transmission driven by said source of power and providing a plurality of selectable gear ratios, a first shaft driven by said transmission at speeds variable in accordance with a selected ratio of said transmission, a second shaft driven by said source of power and driving said transmission, first chain means driven by said first shaft and connected to said first carriage whereby the first carriage is moved in said first path at speeds variable in accordance with the selected ratio, second chain means driven by said second shaft and driving a reversing gear mounted on said first carriage, and third chain means mounted on said first carriage and driven by said reversing gear, said third chain means being connected to said second carriage whereby the second carriage is driven on said first carriage.

10. Apparatus for travelling a magnetic detector coil on a plurality of selectable angular paths in a horizontal plane in proximate spaced relation with respect to a magnetic model comprising, in combination, first movable means composed of non-magnetic material mounted for movement in a first path, elongated means having an axis generally parallel to said first path, said elongated means being composed of non-magnetic material and adapted to support a magnetic model, second movable means composed of non-magnetic material supporting a magnetic detector coil and mounted on said first means for movement in a second path beneath said elongated means, driving means for moving said first and second movable means on the first path of travel, and driving means for moving said second movable means on said second path of travel.

11. An apparatus for travelling a magnetic detector coil on a plurality of selectable angular paths in a horizontal plane in proximate spaced relation with respect to a magnetic model comprising, in combination, a first carriage composed of non-magnetic material movable in a first path of travel, a second carriage composed of non-magnetic material supporting said detector coil and movable in a second path of travel beneath said model at a right angle to said first path of travel, means including a drive shaft for moving said first carriage along said first path of travel, means including a second drive shaft for moving said second carriage along said second path of travel, and variable ratio selective means interconnecting said first and second drive shafts for moving said carriages at different selected speeds relative to each other thereby to provide selected angular paths of travel for the detector coil.

12. A device of the class disclosed comprising supporting means, a magnetic model fixedly supported on said supporting means, a magnetic detector, a translational moving carriage composed of non-magnetic material supporting said magnetic detector for movement beneath said model for detecting the magnetic signature of the model, driving means for said carriage, and means surrounding said carriage and magnetic detector for preventing distortion of the magnetic signature of the model by stray magnetic fields.

13. An apparatus for travelling a magnetic detector coil on a plurality of selectable angular paths in a horizontal plane in proximate spaced relation with respect to a magnetic ship model thereby to detect the magnetic signature of the model comprising, in combination, means composed of non-magnetic material for movement in a first path of travel, model supporting means composed of non-magnetic material and having an axis generally parallel to said first path, second means composed of non-magnetic material supporting a magnetic detector coil and mounted on said first named means for movement beneath said supporting means in a second path at a right angle to said first path, driving means for said first and second means, and a plurality of nulling devices encompassing said first and second means and detector coil for preventing stray magnetic signals from effecting said detector coil.

References Cited in the file of this patent

UNITED STATES PATENTS

| | | |
|---|---|---|
| 1,892,826 | Bettison et al. | Jan. 3, 1933 |
| 1,945,928 | Wilkens et al. | Feb. 6, 1934 |
| 1,954,975 | Zuschlag | Apr. 17, 1934 |
| 2,494,663 | Lobosco | Jan. 17, 1950 |
| 2,531,807 | Pangher | Nov. 28, 1950 |
| 2,557,761 | Powell | June 19, 1951 |
| 2,569,328 | Omberg | Sept. 25, 1951 |
| 2,612,627 | Straney | Sept. 30, 1952 |
| 2,622,871 | Martin | Dec. 23, 1952 |
| 2,628,539 | Neergaard | Feb. 17, 1953 |
| 2,684,464 | Hastings et al. | July 20, 1954 |

FOREIGN PATENTS

| | | |
|---|---|---|
| 3,817 1890 | Great Britain | Jan. 24, 1891 |